US007251777B1

(12) United States Patent
Valtchev et al.

(10) Patent No.: US 7,251,777 B1
(45) Date of Patent: Jul. 31, 2007

(54) METHOD AND SYSTEM FOR AUTOMATED STRUCTURING OF TEXTUAL DOCUMENTS

(75) Inventors: Tsvetomir V. Valtchev, Franklin, WI (US); Pradeep K Jain, Wind Lake, WI (US)

(73) Assignee: HyperVision, Ltd., Franklin, WI (US)

( * ) Notice: Subject to any disclaimer, the term of this patent is extended or adjusted under 35 U.S.C. 154(b) by 398 days.

(21) Appl. No.: 10/826,892

(22) Filed: Apr. 16, 2004

Related U.S. Application Data

(60) Provisional application No. 60/463,587, filed on Apr. 16, 2003.

(51) Int. Cl.
*G06F 17/24* (2006.01)
*G06F 17/30* (2006.01)
(52) U.S. Cl. .......................................... 715/513; 707/6
(58) Field of Classification Search ........ 715/512–513, 715/500, 517; 707/6, 102
See application file for complete search history.

(56) References Cited

U.S. PATENT DOCUMENTS

| 7,036,073 | B2 * | 4/2006 | Jones et al. ................. 715/517 |
| 2002/0143815 | A1 * | 10/2002 | Sather ......................... 707/513 |
| 2003/0120686 | A1 * | 6/2003 | Kim et al. ................... 707/200 |
| 2003/0237048 | A1 * | 12/2003 | Jones et al. ................. 715/513 |
| 2004/0006744 | A1 | 1/2004 | Jones et al. |
| 2004/0205571 | A1 * | 10/2004 | Adler et al. ................. 715/513 |
| 2004/0205615 | A1 * | 10/2004 | Birder ......................... 715/523 |
| 2006/0265689 | A1 * | 11/2006 | Kuznetsov et al. ......... 717/117 |

OTHER PUBLICATIONS

Exegenic; "Exegenix Launches New XML Document Conversion System;" May 20, 2002; pp. 1-2.
Exegenic; "Exegenix Technology FAQ;" Apr. 2003 or earlier; pp. 1-2.
Exegenic; "Intelligent Document Conversion Solutions™;" 2002; pp. 1-2; Tata Infotech Limited, (no month).
Michael A. Goulde; "Interleaf's BladeRunner Uses XML to Help Manage Reusable Content;" Internet Tools and Technologies Service—e-Bulletin; Aug. 17, 1998; pp. 1-6; Patricia Seybould Group; Boston, Massachusetts.
Interleaf, Inc.; "Putting XML to Work;" Jul. 1998; pp. 1-12.

(Continued)

*Primary Examiner*—Don Wong
*Assistant Examiner*—Hung Tran Vy
(74) *Attorney, Agent, or Firm*—Michael Best & Friedrich LLP

(57) ABSTRACT

Disclosed is a method for customizable schema-guided conversion of plain-text documents, rich-text documents and textual data records to an XML-compatible structured form. The method makes substantial use of element content model definitions from a chosen target XML schema/DTD to optimize, closely guide, and disambiguate element pattern matching and recognition. Highly granular structure can be inferred, in best possible conformance with the schema. One embodiment operates based on a finite state machine derived via recursive aggregation of the schema element content models. Additionally disclosed is a method for automated document structuring within the environment of an XML-enabled wordprocessor application. The method entails using the host's API to perform element pattern search and matching and to apply markup to the document in accordance with the inferred XML structure. A GUI framework integrated in the wordprocessor workspace can be provided for developing and executing document conversion/structuring definitions.

20 Claims, 15 Drawing Sheets

OTHER PUBLICATIONS

Prescod, Paul; "Introduction to XML Tools;" Apr. 2003 or earlier; pp. 1-49.

Golfman, Irina; "Structured Content out of Microsoft Word—Technologies & Tricks;" XML World 2000: The Joy of Structure; Sep. 6, 2000; Inera Incorporated; pp. 1-11.

Hypervision, LTD.; "WorX™ for Word v3.2: Simplifying the Enterprise Authoring Experience;" 2003; pp. 1-2; HyperVision Ltd.

Alschuler, Liora; "Getting the Tags In: Vendors Grapple with XML-Authoring, Editing and Cleanup;" Seybold Report on Internet Publishing; Feb. 2001; pp. 1-3; vol. 5, No. 6; Seybold Publications; Media, Pennsylvania.

Hypervision, Ltd; WorX™ SE Administrator Training Manual Student Edition; Feb. 2001; pp. 1-75; HyperVision, Ltd.

Hypervision, Ltd; WorX™ SE User Training Manual; Feb. 2001; pp. 1-99; HyperVision, Ltd.

Exegenix; "Document complexity in XML conversion;" Apr. 2003 or earlier; pp. 1-2.

Exegenix; "Frequently-Asked Questions;" Apr. 2003 or earlier; pp. 1-3.

Exegenix; "Intelligent Document Conversion Solutions™;" 2002; pp. 1-2; Tata Infotech Limited, (no month).

Exegenix; "The Exegenix™ Conversion System;" 2002; pp. 1-2; Tata Infotech Limited, (no month).

Exegenix; "Exegenix Raises the Bar on XML Conversion: Interactive, automated XML document conversion now available;" Dec. 9, 2002; pp. 1-2.

"Transforming Engines;" Apr. 2003 or earlier; pp. 1-13.

* cited by examiner

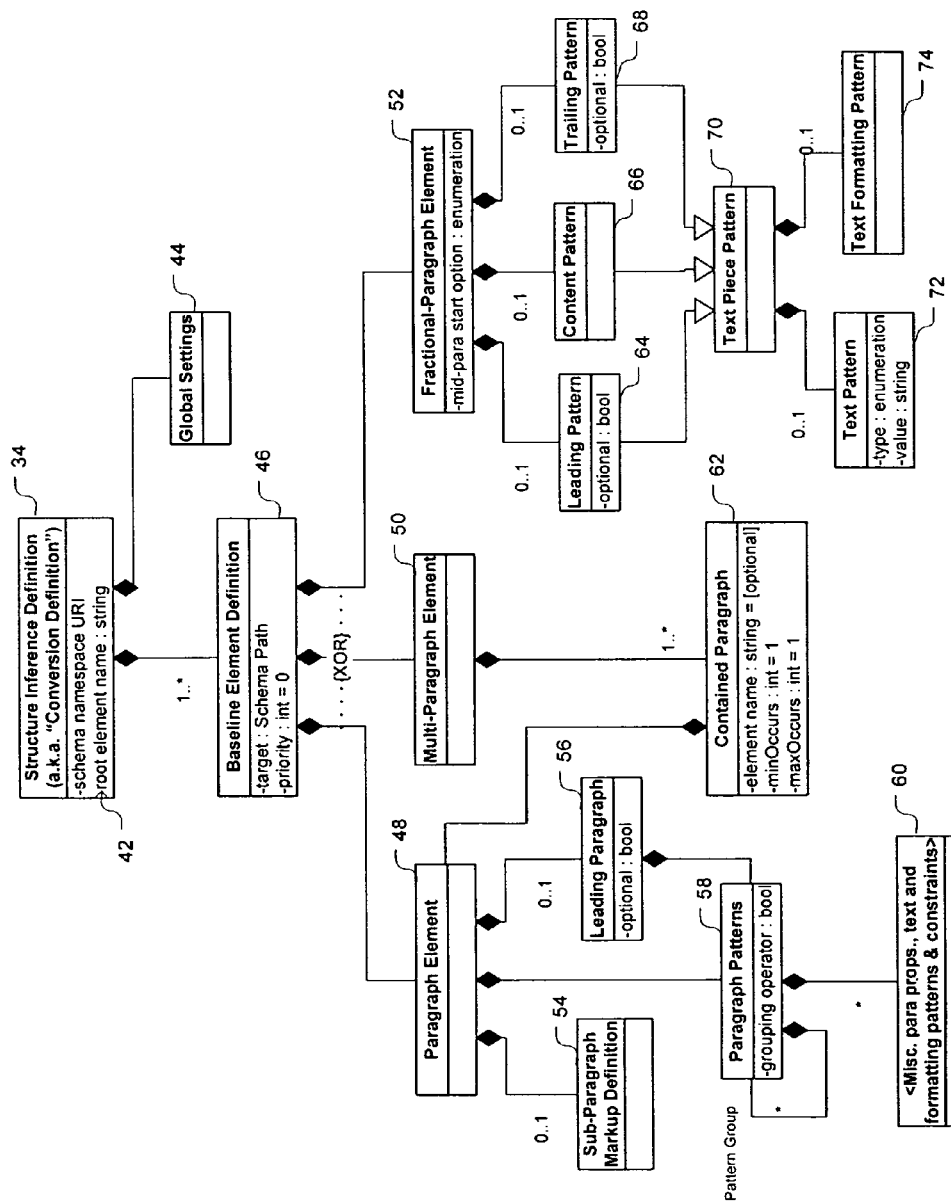
Figure 3: Structure Inference Definition Schema

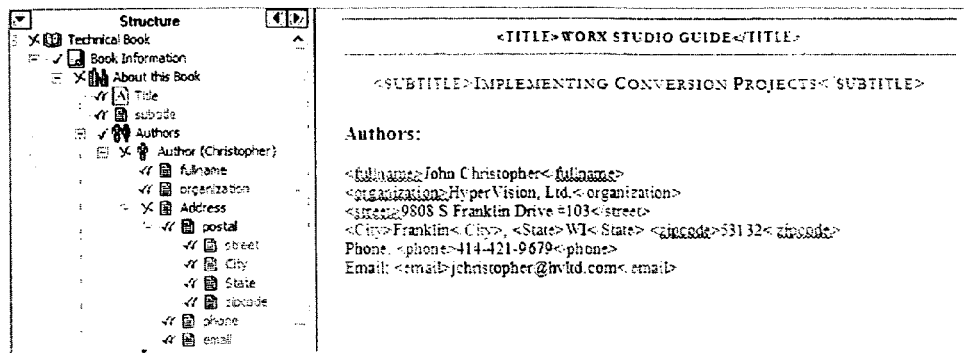
Figure 4: Example of Baseline Elements
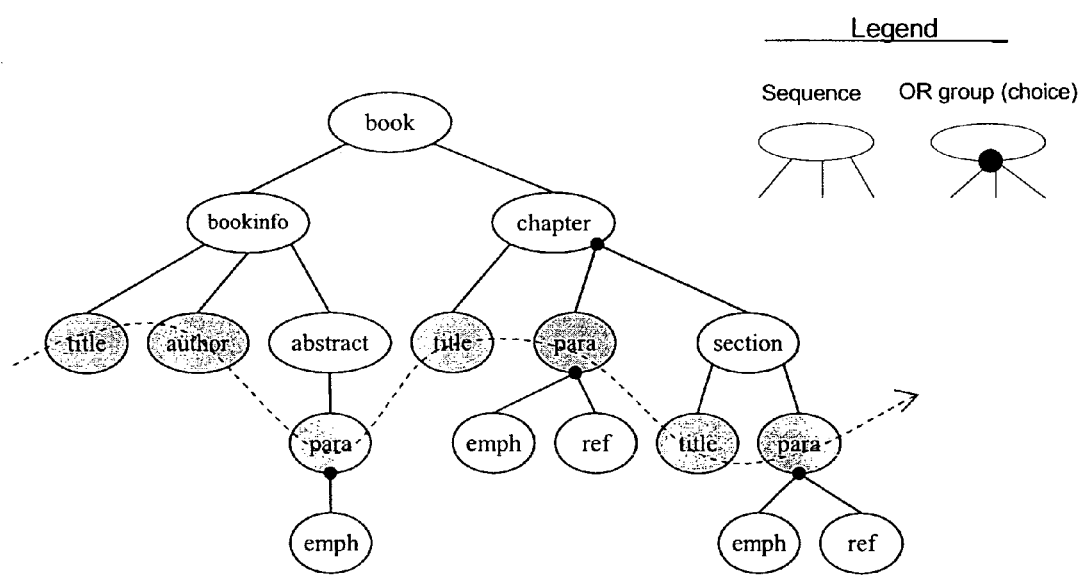
Figure 5: Example of Element Baseline in a document schema

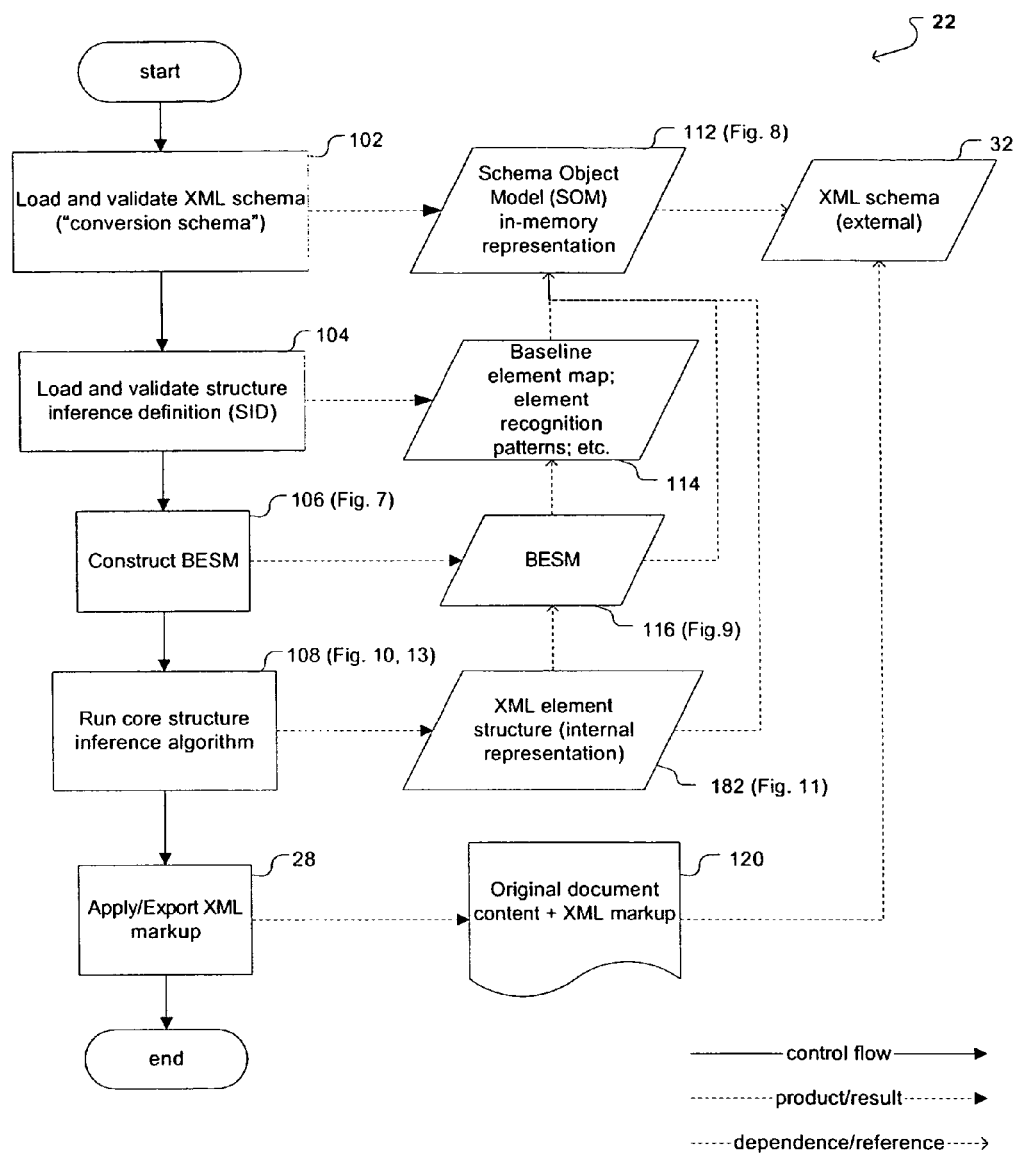
Figure 6: Conversion/structuring process: document parsing, structure inference, and XML markup creation

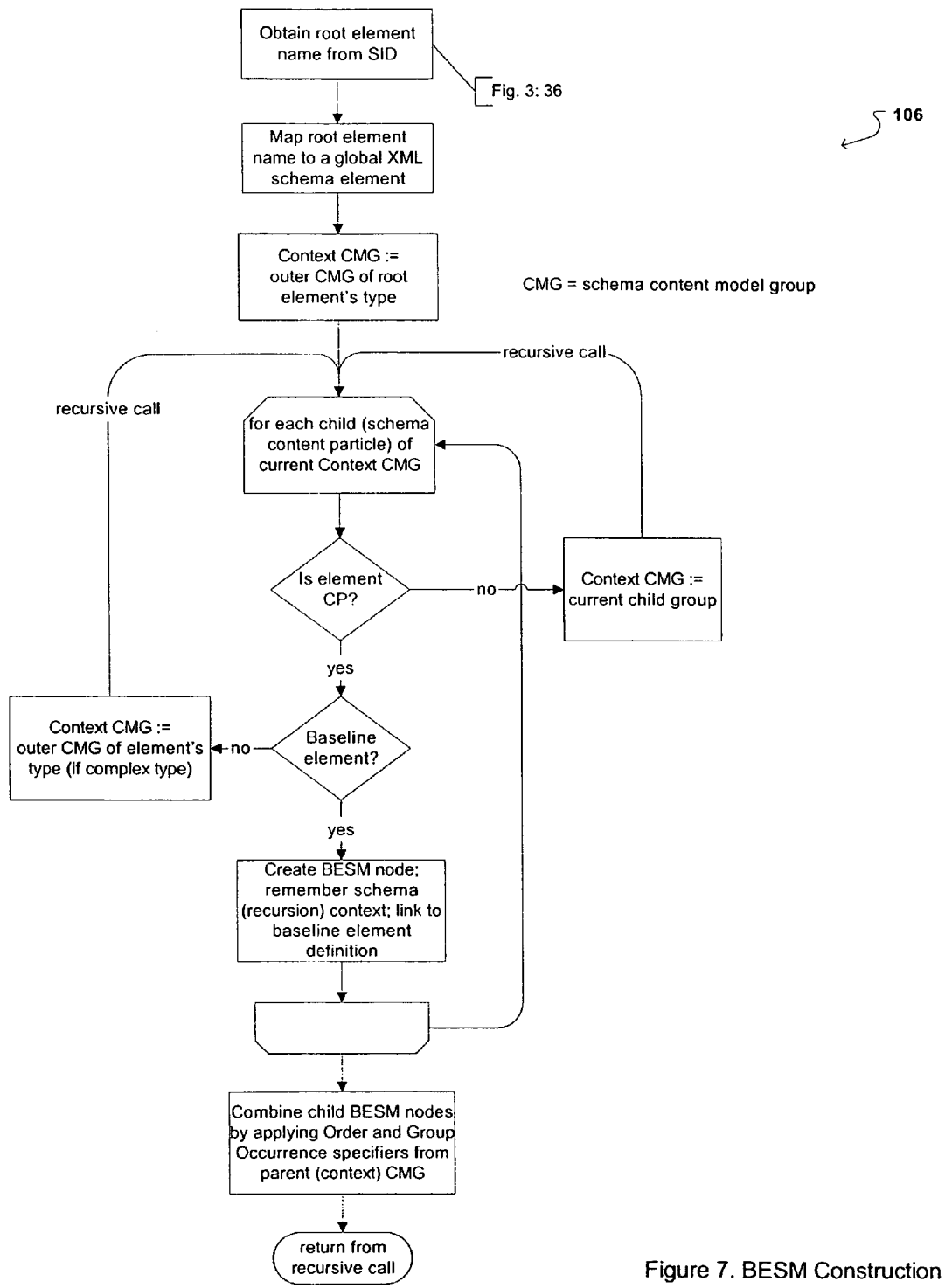
Figure 7. BESM Construction

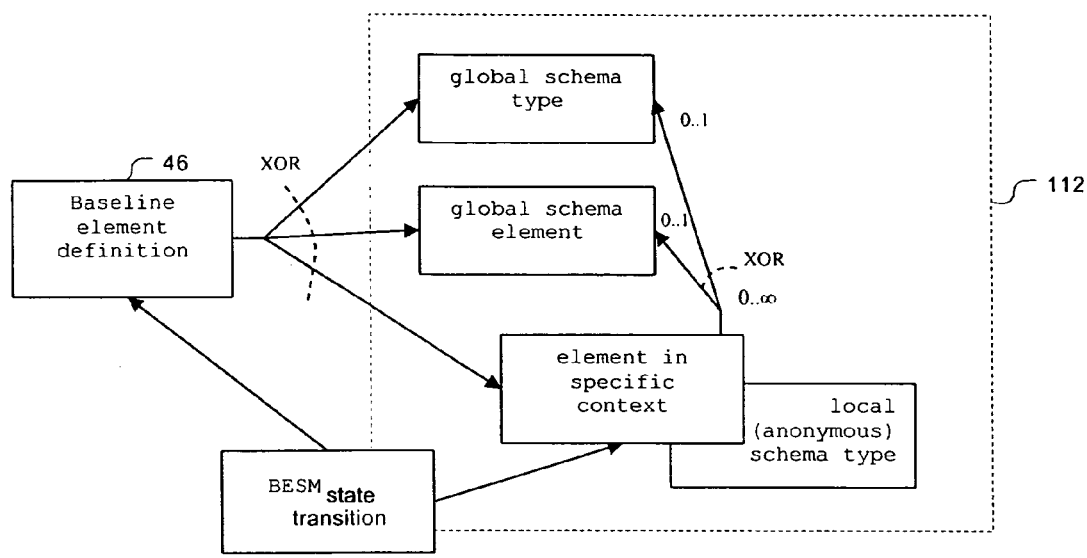
Figure 8. Data-structure relations between baseline elements, the BESM, and the XML schema

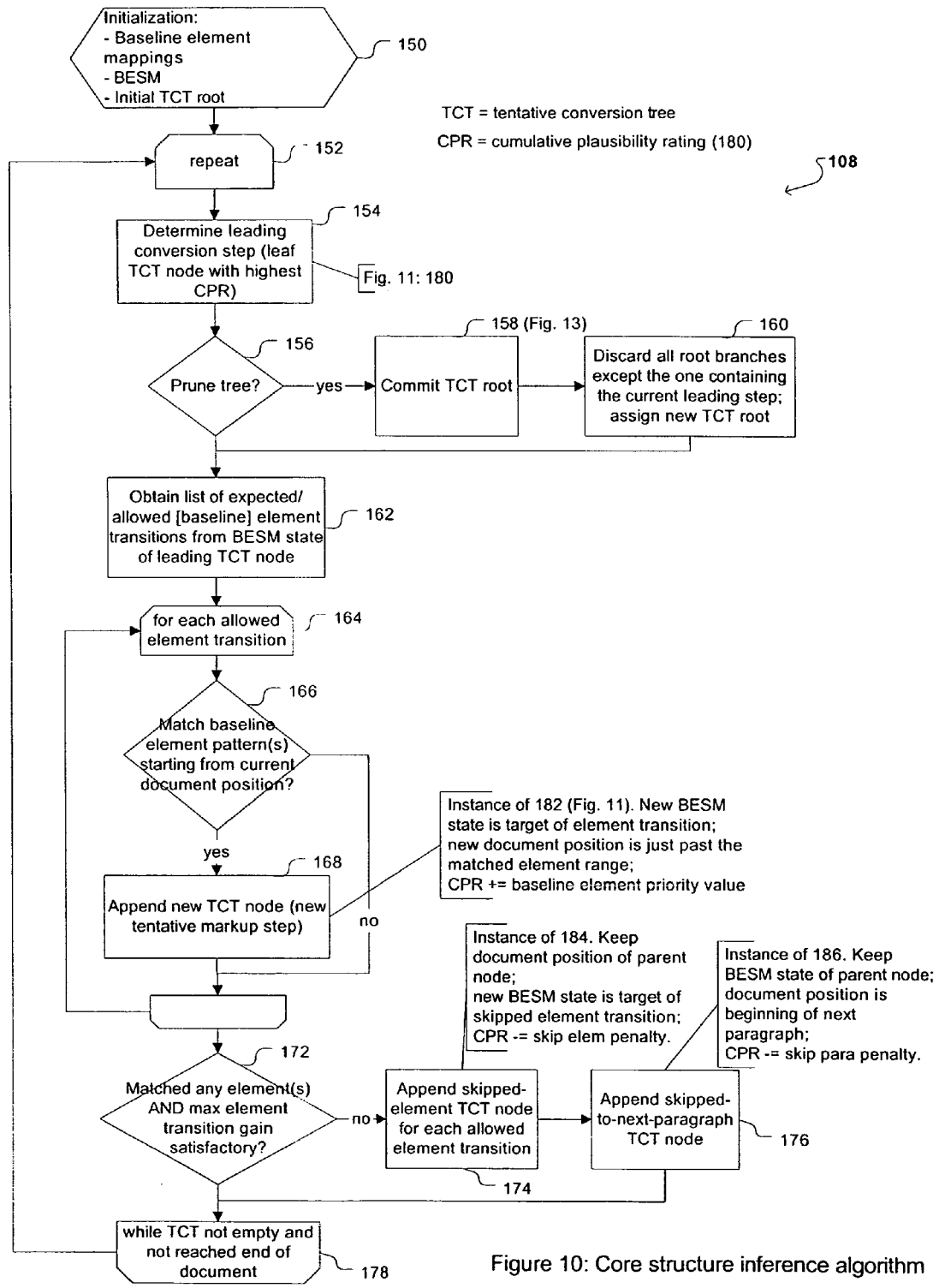
Figure 10: Core structure inference algorithm

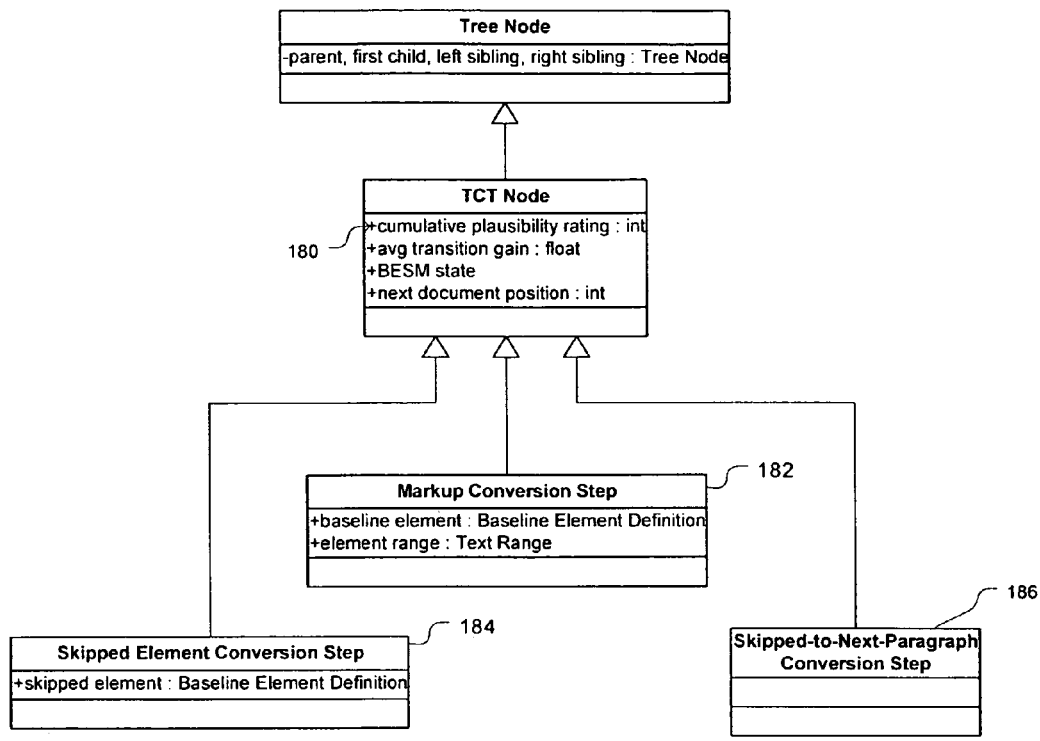
Figure 11. Tentative conversion tree (TCT) nodes, holding information about tentative conversion steps within the core structure inference algorithm

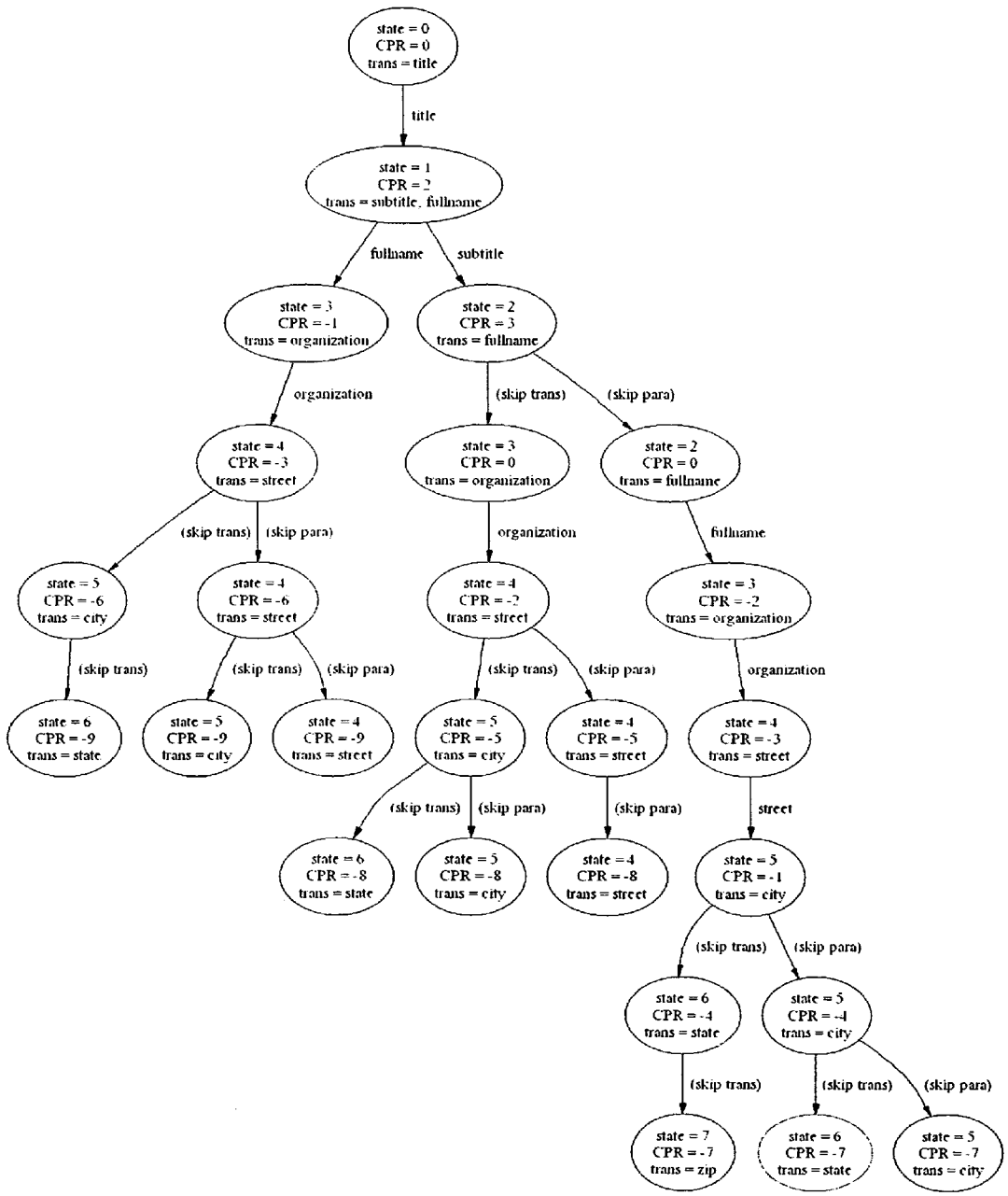
Figure 12: Tentative conversion tree sample

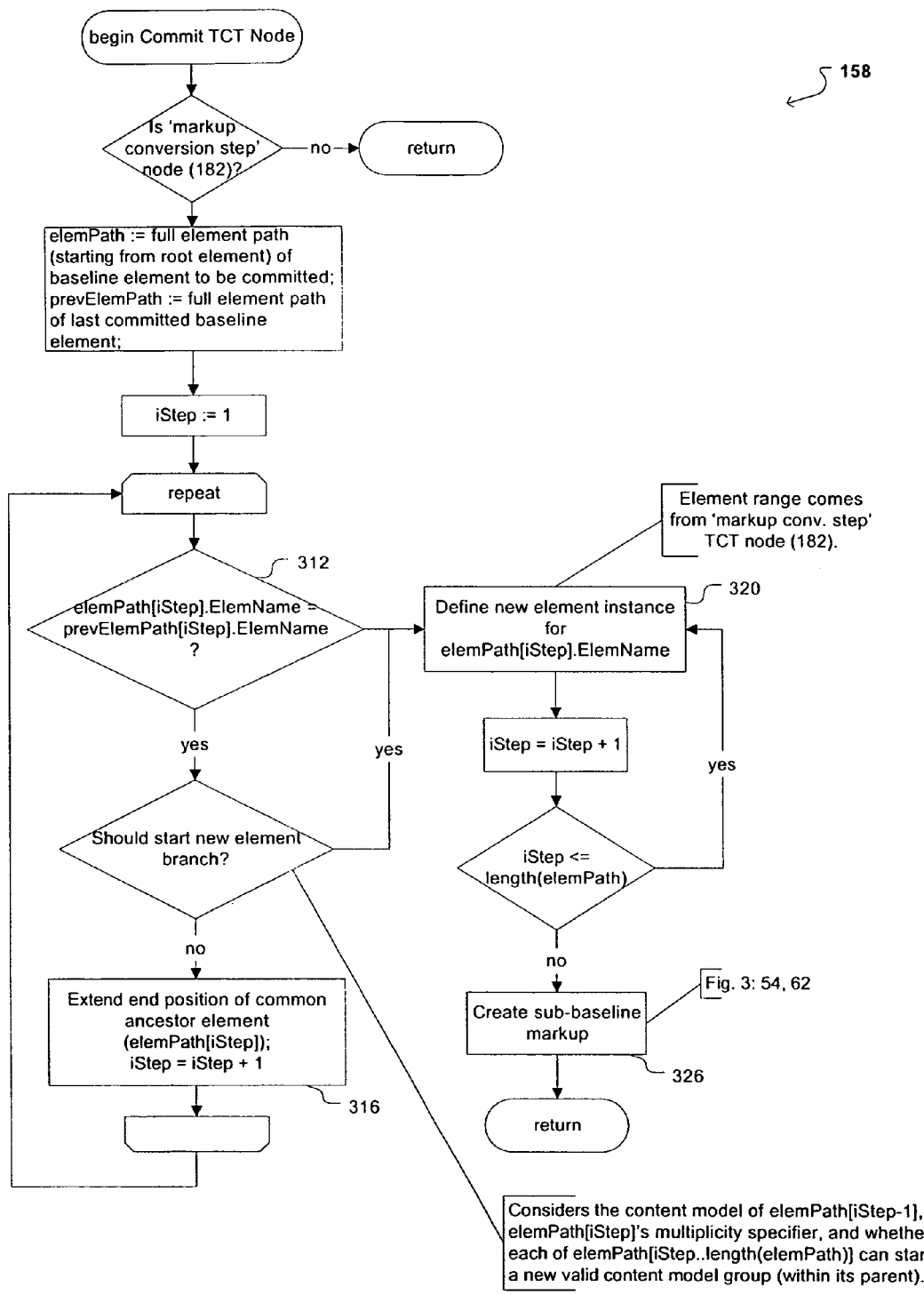
Figure 13. Committing a TCT node: creating a baseline element, inferring and creating higher-level structure, and creating sub-baseline markup

| |
|---|
| Marked Up: /book/bookinfo/bookbiblio/authorgroup/author/address/address/email |
| Conversion State: [document position]; cumulative rating: 20<br>Expected elements: uri, para, fullname, pubdate, para >><br>Matched Elements: uri |
| Marked Up: /book/bookinfo/bookbiblio/authorgroup/author/adress/uri |
| Conversion State: [document position]; cumulative rating: 14<br>Expected elements: para, fullname, pubdate, para >><br>Matched Elements: (None) |
| Skipped to Next Paragraph |
| Conversion State: [document position]; cumulative rating: 14<br>Expected elements: para, fullname, pubdate, para >><br>Matched Elements: fullname |
| Marked Up: /book/bookinfo/bookbiblio/authorgroup/author[2]/fullname |
| Conversion State: [document position]; cumulative rating: 9<br>Expected elements: organization >><br>Matched Elements: organization |
| Marked Up: /book/bookinfo/bookbiblio/authorgroup/author[2]/organization |
| ⋮ |
| Marked Up: /content/document/section[6]/reference[23]/titlegroup/title |
| Conversion State: [document position]; cumulative rating: 453<br>Expected elements: volume, title >><br>Matched Elements: volume |
| Marked Up: /content/document/section[6]/reference[23]/volume |
| Conversion State: [document position]; cumulative rating: 452<br>Expected elements: page >><br>Matched Elements: page |
| Marked Up: /content/document/section[6]/reference[23]/page |
| Conversion State: [document position]; cumulative rating: 453<br>Expected elements: number, name, heading >><br>Matched Elements: (None) |
| Skipped Element: /content/document/section/heading |
| Conversion State: [document position]; cumulative rating: 442<br>Expected elements: number, name, p, heading >><br>Matched Elements: p |
| Marked Up: /content/document/section[6]/p |
| Conversion State: [document position]; cumulative rating 437<br>Expected elements: p, heading, heading >><br>Matched Elements: p |

*FIG. 14: Conversion/markup Report samples*

METHOD AND SYSTEM FOR AUTOMATED STRUCTURING OF TEXTUAL DOCUMENTS

CROSS-REFERENCE TO RELATED APPLICATION

The present application claims the benefit of U.S. Provisional Patent Application No. 60/463,587 for "Method for Automated XML-Compatible Structuring of Rich text Documents Within Microsoft Word" filed Apr. 16, 2003.

BACKGROUND OF THE INVENTION

1. Field of the Invention

The present inventions relate to software applications that aim to automate the generation of extensible markup language (XML) structure from plain-text documents, rich-text documents and textual data records, in which software provides for implementing the automated inference of XML structure and application of corresponding XML markup to target documents and textual data records, and for automated conversion of unstructured textual documents to XML.

2. Description of the Related Art

Many businesses migrating to XML-based IT solutions will face the problem of converting large volumes of legacy documents existing in various storage formats to XML. The conversion problem also arises in scenarios where XML is needed by back-end and workflow systems, but document authors are unwilling or unable to use a specialized XML authoring tool and typically prefer to work instead in a generic wordprocessor such as Microsoft Word. Transformation of unstructured content into XML is one of the most challenging tasks in many XML-oriented initiatives. In many multi-channel publishing environments, content conversion to XML is often a requirement. For such environments, there is a need for highly effective, fully customizable conversion of unstructured textual content to XML, without disrupting communication with authors and content contributors who are using ordinary wordprocessor documents.

There are currently a number of converter software packages available, most of them classifiable as RTF-to-XML converters. The basis for this generic classification is the common assumption that various textual document formats, such as Microsoft Word and Corel WordPerfect, can be easily converted to RTF first, with minimal or no loss of fidelity, and then a single, uniform method can be used for parsing the RTF data, analyzing text content and formatting, and producing XML output conforming to some predefined XML schema/DTD. Similarly, some solutions use HTML or a proprietary intermediate format. Known software converter packages include XDocs from CambridgeDocs (Charlestown, Mass.), VorteXML from Datawatch Corporation (Lowell, Mass.), ContentMaster from Itemfield (Israel), Logictran RTF Converter (Minnetonka, Minn.), X-ICE by Turnkey Systems (Sydney, Australia), upCast by Infinity Loop (Germany), YAWC (Ireland) and Omnimark from Stilo (Bristol, United Kingdom). Typically the basis for conversion in prior art systems is mapping styles and custom formatting to XML elements, sometimes using text patterns as well. Some converters provide integration with a standard scripting language or define one of their own so that custom conversion rules and conditions can be expressed, e.g., Omnimark from Stilo (Bristol, United Kingdom). It is worth noting that in most cases mapping of patterns to schema elements is done ad hoc, without relying on some schema-guided conversion model that takes into account the element nesting and validity constraints defined in the target schema. More esoteric or special-purpose conversion applications are known that employ statistical analysis (Bayesian probability), vector machines, or neural networks as a basis for more "intelligent" structure inference.

Conversion quality largely depends on the structural consistency of input documents, the availability and consistency of formatting, the sophistication of the conversion tool and the extent to which it is properly configured and optimized for processing of specific document types. The performance of prior solutions rarely has been satisfactory in practice. After the initial 'batch' processing, an operator or a content specialist usually needs to review the resulting XML document(s), manually fix structure inference errors and create any missing desired structure. Doing this typically involves using a specialized XML editing tool, which is independent from and not conveniently integrated with the conversion tool used in the first place. If it is found that poor conversion results are due to inconsistent or unexpected formatting or order of elements in the source unstructured document, either the document has to be modified to match the conversion rules and patterns or the latter have to be modified to account for the variability, and eventually the whole conversion-review-correction process has to be repeated. Even in a fully automated conversion process, human intervention is often unavoidable if semantically and structurally valid documents are the objective.

A need exists for the provision of quality support for conversion of unstructured documents to an XML-compatible structured form. To this end, it would be desirable to facilitate the entire conversion process (document analysis, definition of conversion rules and patterns, invocation of automatic parsing and markup generation, and subsequent review, correction and completion of results) within the GUI workspace of an XML-enabled generic wordprocessor such as Microsoft Word, which can be more efficient and convenient than the use of traditional RTF-to-XML converters in combination with standalone RTF viewers and XML editors. Further it would be desirable to provide an integrated set of GUI tools for streamlined review of the conversion results and automatic identification of omissions and potential 'trouble spots' in the document. Another significant advantage of having document conversion functionality built within an XML-enabled wordprocessor over other conversion frameworks would be that all the original formatting and layout of the source document could be preserved, eliminating the need for manual re-formatting after XML markup is applied.

Two related additional problems associated with traditional converters are that 1) they ignore and subsequently lose significant formatting information and structural clues from the source document that are not explicitly recognized and/or somehow incorporated into the output XML data and 2) they separate (branch) the resultant XML document from the source unstructured document. These deficiencies are a consequence of the basic fact that existing conversion solutions build or convert to a new XML document from scratch and create element markup for source content ranges of only recognized formatting, while pure XML has no provisions for expressing formatting information. Therefore, ranges with unrecognized formatting get reduced to plain text in the output.

In a variety of initiatives involving streamlining of document-centric enterprise business processes, conversion to XML is not an end in itself. Rather, it should be viewed only a means to enable automated processing of documents and execution of business logic based on the data contained in them, while humans continue to consume and update the content of their documents, desirably just the way they did this before introduction of XML in the process. The recent availability of XML-enabled generic wordprocessor applications (Microsoft Word 2003+, HyperVision's WorX for Word plug-in in conjunction with Word 2000+, Corel WordPerfect) creates the novel possibility for automatic application of XML-compatible markup to textual documents while maintaining the documents' rich-text content intact and avoiding versioning and content synchronization problems by essentially keeping the generated XML markup with the source data (and not having any other copies of the data at all). XML-aware domain-specific business applications could be built to operate on thus structured documents involved in a continuous business process, without burdening users with the complexity of a specialized XML authoring tool. Preservation of the original layout (e.g., white space, pagination, line numbering and the like) is often desirable and advantageous as a crucial requirement for many document types, especially the legal documents. Such applications may also need the ability to have XML structure/markup applied to select document ranges only, not to the entire document at once. For example, blocks of unstructured data, such as customer addresses or standard contract clauses, may need to be imported from outside and then automatically structured in accordance with the XML schema associated with the document. In summary, providing all such automated XML structuring capabilities and benefits in the context of XML-enabled wordprocessor applications is among the objects of the present invention.

SUMMARY OF THE INVENTION

One major aspect of the invention relates to a generic XML structure inference and construction method that makes substantial use of element content models (comprising information about element nesting, order, multiplicity, content validity constraints, element groups, etc.) defined in the XML schema/DTD in accordance with which unstructured textual documents are to be marked-up. The method can be embodied in an engine component, which takes as input an XML schema/DTD, a structure inference definition created for a document type based on this schema/DTD, and operates on a given unstructured document to analyze its text content and formatting and produce XML structure that captures the inherent logical structure of the document (as it may be perceived by a human).

On a basic level, individual elements and element groups are identified via predefined-pattern search and matching. Such patterns may include any formatting features present in the target document type, whitespace and content length conditions, text literals, keyword lists, wildcards, and regular expressions, as well as nearly arbitrary logical combinations of such atomic patterns. The search is optimized and guided using a compilation of the element content model definitions from the schema. Conceptually, information about element nesting and validity constraints from the schema provides the structure inference component with strong hints about which particular elements to expect at a given document position, in reference to the current schema context determined by all previously matched elements (earlier in the document). This schema-guided search substantially limits the document localities for testing element patterns and thus offers several benefits, including requiring a pattern to be evaluated/tested only where an element match is possible/expected (in a schema-valid document instance); allowing fairly simple and loosely-defined patterns to be used and still get the desired matches while minimizing false matches; minimizing the number of pattern definitions that need to be provided by using the available contextual information to automatically construct higher-level document structure (for all elements "above" the ones directly matched/recognized by explicit patterns); and allowing a considerably high degree of XML structuring/conversion accuracy and completeness to be achieved by using an arbitrary custom schema that is only expected to adequately model the inherent logical structure of the target documents.

Recognition patterns need to be created only for select elements from the target XML schema/DTD, called baseline elements. These are usually leaf-level or near-leaf-level elements expected to encompass the bulk of the document text (FIG. 4). Conceptually, such elements typically occur on an imaginary line (not necessarily continuous) that runs "across" the schema tree obtained by full recursive expansion of all element content models starting from a single designated root element (FIG. 5).

A particular embodiment of the above schema-guided structure inference method entails constructing a single finite state machine, called baseline element state machine (BESM), in which transitions are labeled by the identifies of all baseline elements in specific contexts with respect to the designated root element. (See samples in FIG. 9.) BESM construction is done by recursive aggregation of all schema element content models, starting from the designated root element and down to the level of designated baseline elements. Conceptually, the state machine thus constructed has the capacity to properly validate instances of the target document type in which all higher-level markup/structure is stripped so that baseline element instances become immediate children of the root element. For the purpose of guiding the structure inference process, specifically element pattern search, the BESM is used as follows. The engine maintains and updates a current document position and current BESM state, starting from document position zero and the single intrinsic start state of the BESM. In each basic step of the structure inference process, it obtains the set of allowed BESM transitions from the current BESM state and tries to match the recognition patterns associated with each corresponding baseline element starting from the current document position. Upon a successful match, the current document position is advanced beyond the end of the matched range, and the current BESM state is changed to the sink state of the BESM transition in accordance with which the match was made. Special continuation provisions can be made for situations when this simple iterative process gets stuck, for example skipping to the beginning of the next document paragraph or skipping an expected baseline element transition in the BESM when no pattern can be matched at the current document position.

To further refine the method, one particular embodiment performs a limited look-ahead search and match prioritization before committing to any particular apparent baseline element match in an attempt to resolve naturally-occurring ambiguities and discrepancies with respect to the expected document structure (as modeled by the schema) and to maximize the accuracy and completeness of conversion/structuring results. This feature can be implemented by maintaining a tree structure, called tentative conversion tree (TCT, see FIGS. 11 & 12), which allows prioritized consideration of competing baseline element matches at a single document location and also provides a natural framework for implementing the continuation heuristics mentioned above.

When a single sequence [in natural document order] of matched baseline elements is settled, all higher-level XML structure, up to the designated root element, can be inferred from the schema context information associated with the baseline elements and can be constructed as XML markup. The goal is to obtain "maximally valid" structure according to the declared content models of all higher-level elements, having the sequence of baseline elements as fixed leaf-level nodes in the XML tree. FIG. 13 outlines one possible implementation of this process.

As a possible extension to the described structure inference and construction method, provisions can be made for recognizing and marking-up one or more additional levels of XML elements within matched baseline elements, such as for inline elements within a paragraph-extent baseline element and for select individual paragraphs within a multi-paragraph baseline element.

The present invention may be embodied as an add-on to a qualified host word-processing application, which is capable of incorporating non-native XML-compatible markup in its documents and has a generic API to its major functionality, and turn such a host application into a tool and integrated environment for automated structuring (marking-up) of textual documents and conversion to XML. Target documents can be of any format that can be opened or imported by the host application, for example Microsoft Word, RTF, HTML, and plain-text. The original content and appearance of thus structured documents remain intact in the process by only applying XML-compatible markup via the API of the host application as a new content layer, only optionally visible, and tightly correlated with the underlying rich-text content. The actual structure inference and construction method used can be the one described above or any other one that can be implemented to operate by means of the API of the host application. A pure-XML image of the document thus structured can be obtained via the host application's Export XML or Save As XML function (or equivalent). Document analysis, structure inference definition development, testing and fine-tuning thereof, and actual document structuring (marking-up) or conversion to XML, as well as any domain-specific post-processing and editorial/workflow functions can all take place within the integrated graphical user interface (GUI) environment of the host application and the XML conversion/structuring add-on. (FIG. 1 shows a generalized overall workflow.)

All of the foregoing aspects and features of the invention may in principle be realized independently of each other in different products or product variants and can target different qualifying host applications. It should also be noted that even though the present discussion takes the perspective of describing an "add-on" component for a "host application", it is conceivable and quite possible that the essential functionality of such an add-on can be implemented natively within an application that has the same requisite general characteristics.

BRIEF DESCRIPTION OF THE DRAWINGS

For the purposes of promoting an understanding of the principles of the inventions, reference will now be made to the embodiments illustrated in the drawings and specific language will be used to describe the same. It will nevertheless be understood that no limitation of the scope of the invention is thereby intended.

FIG. 3 is a UML class diagram showing a conceptual/high-level view of the Structure Inference Definition schema, which governs the creation of concrete structure inference definitions for specific document types.

FIG. 4 is an example of designated baseline elements within an already-structured document instance.

FIG. 5 is an example of baseline elements in the context of an XML schema. It shows the implied element baseline, which underlies some of the essential concepts in the schema-guided structure inference method.

FIG. 6 outlines the process of applying a given structure inference definition to a given unstructured document in order to obtain XML markup, in the context defined by FIG. 1. The product/result of each high-level step is also shown.

FIG. 7 is a flowchart of the baseline element state machine (BESM) construction process performed in the context of FIG. 6.

FIG. 8 illustrates the conceptual/logical relations between the data structures used at runtime to accommodate the baseline element definitions, the BESM, and the XML schema. Resolved baseline element definitions reference corresponding target XML schema components within an in-memory schema object model (112).

FIG. 10 is a flowchart of the core schema-guided structure inference and creation algorithm, including maintenance of a tentative conversion tree as a means to implement a limited look-ahead and to resolve pattern match ambiguities and discrepancies with respect to the element content models defined in the schema.

FIG. 11 is a UML class diagram depicting a simple hierarchy of the tentative conversion tree (TCT) nodes, holding information about and essentially representing individual "conversion" steps within the core structure inference algorithm.

FIG. 12 provides a snapshot of a TCT produced by the core algorithm. (Note: markup conversion steps should be assumed to reference full schema paths. These are the schema paths associated with the corresponding baseline elements.)

FIG. 13 is a flowchart detailing step 158 of FIG. 10, committing a TCT node. This entails creating a baseline element, inferring and creating higher-level structure in accordance with the schema path steps of the baseline element and the respective element content models defined in the schema, and creating any sub-baseline markup.

FIG. 14 shows two sample fragments of conversion/structuring reports, derived from the information stored in the sequence of TCT steps that becomes the actual, final conversion path. When presented in this form, the report can aid a user in debugging a structure inference definition and in identifying trouble spots in the converted/structured document. Display elements of the report can be active links to corresponding document positions, to created XML elements, and to baseline element selections in an XML schema GUI browser.

DETAILED DESCRIPTION OF THE PREFERRED EMBODIMENTS

Figure 15:
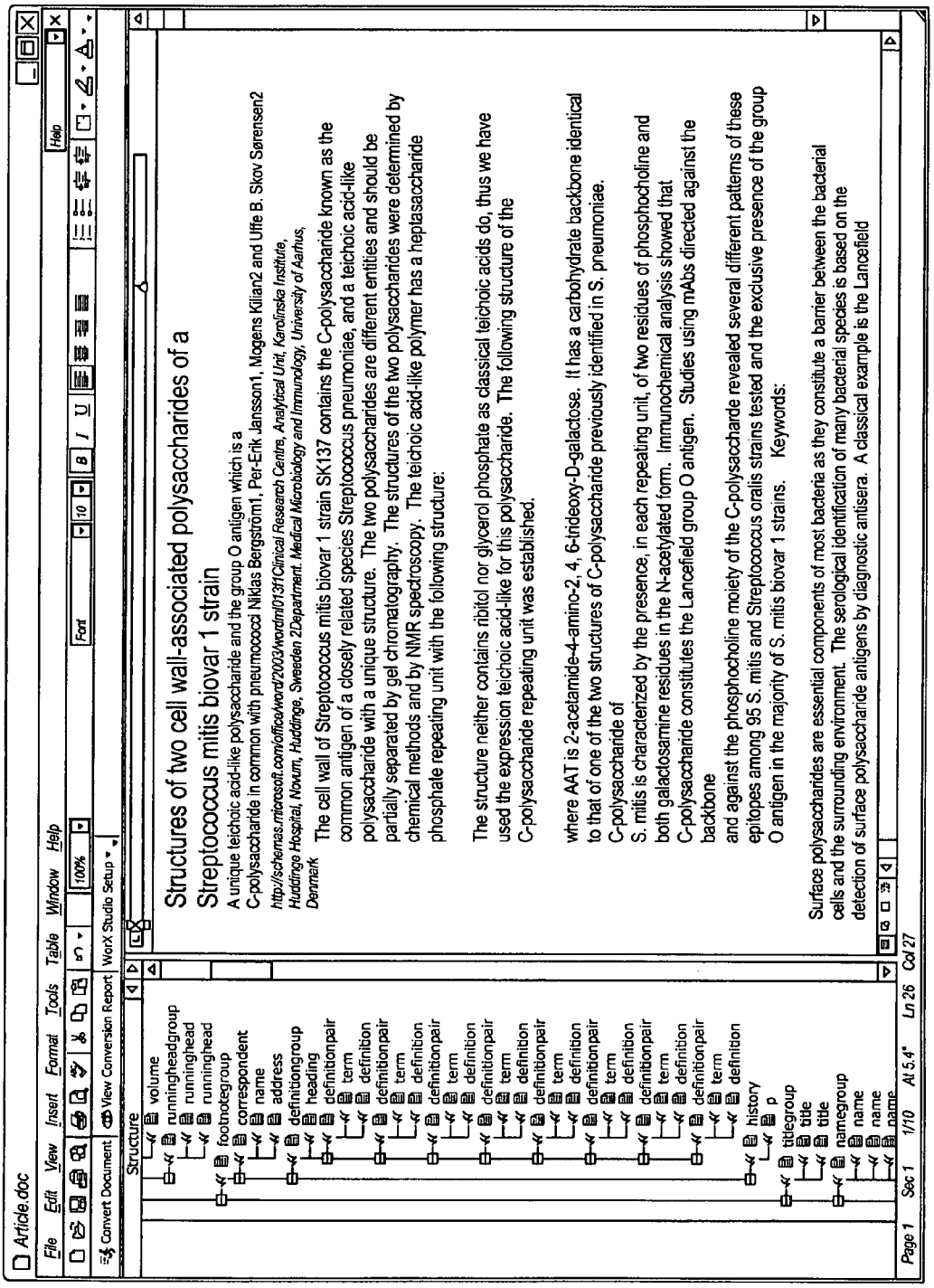
FIG. 15 shows a structured rich-text document, with embedded XML markup.
Figure 16:
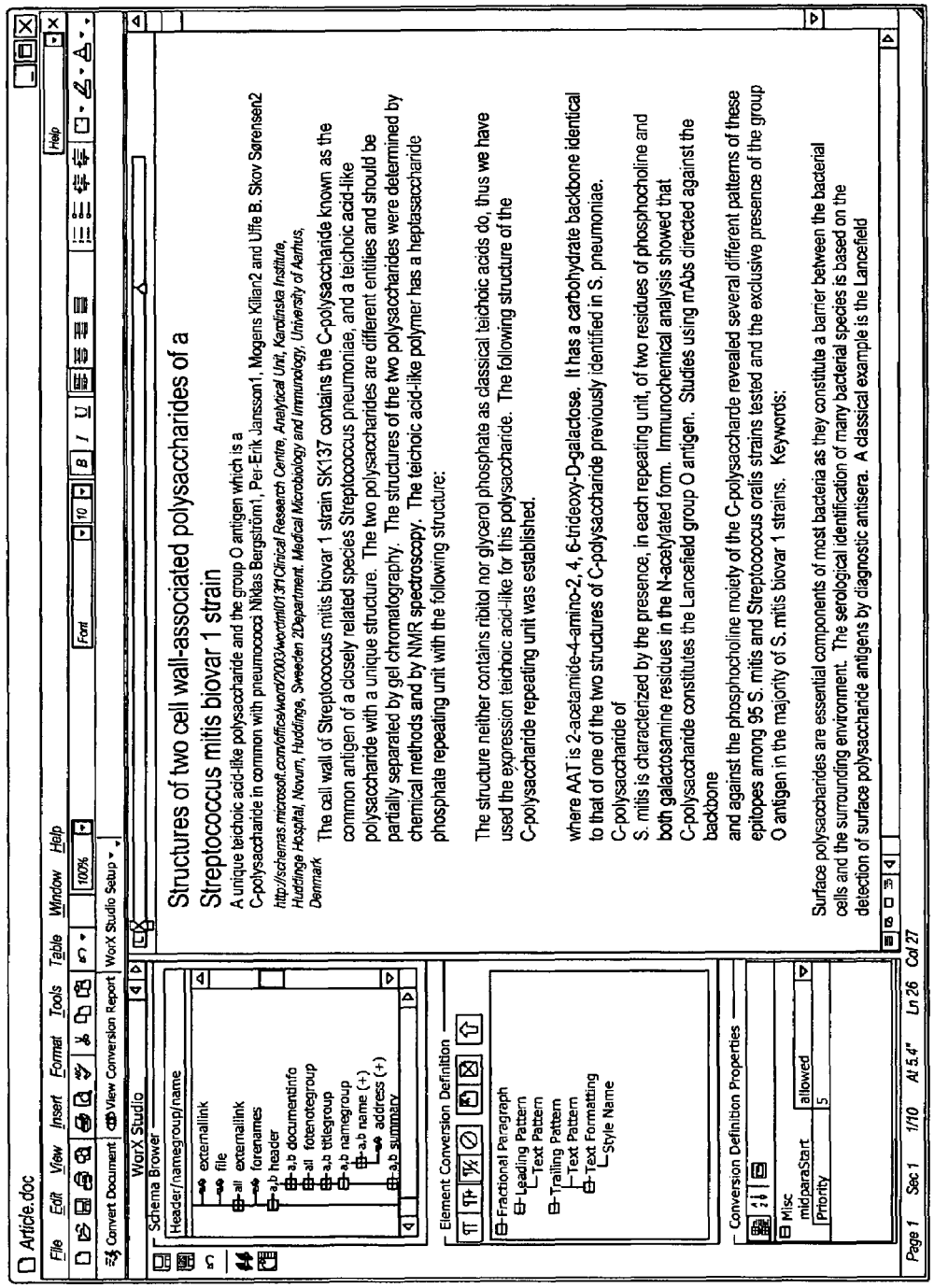
FIG. 16 illustrates what a graphical user interface for creating a structure inference definition might look like and how it can be integrated in the workspace of the host XML-enabled wordprocessor.

The present described embodiment is an add-on to Microsoft Word, version 2000 or newer. It consists of two major components: an XML structuring engine, also called conversion engine, and a GUI framework integrated into the workspace of Microsoft Word for development and execution of document conversion definitions (FIG. 16). Microsoft Word 2003 is the first version to have native support for XML markup associated with a custom XML schema in its documents, and there is sufficiently granular API access to the new XML handling capabilities. Thus it qualifies as an XML-enabled generic wordprocessor and allows the XML conversion engine to use its API to parse an open document and apply XML markup to it. HyperVision's Word for Word plug-in augments Microsoft Word 2000 and newer to become an API-enabled, full-fledged XML authoring tool as well. (See screenshot of an XML-structured document in FIG. 15.) The differences between the two XML-related APIs are almost entirely insignificant in the context of the following discussion. In fact, most of the concepts and implementation details have no dependence on the specifics of the particular XML-enabled wordprocessor chosen and could easily be applied to a different one with no change or with only minimal modification. The present discussion uses the generic term "XML schema" to refer to the W3C XML Schema Definition Language, traditional XML DTDs, and any other language for expressing XML element validity constraints in terms of element content models reducible to regular expressions.

Figure 1:
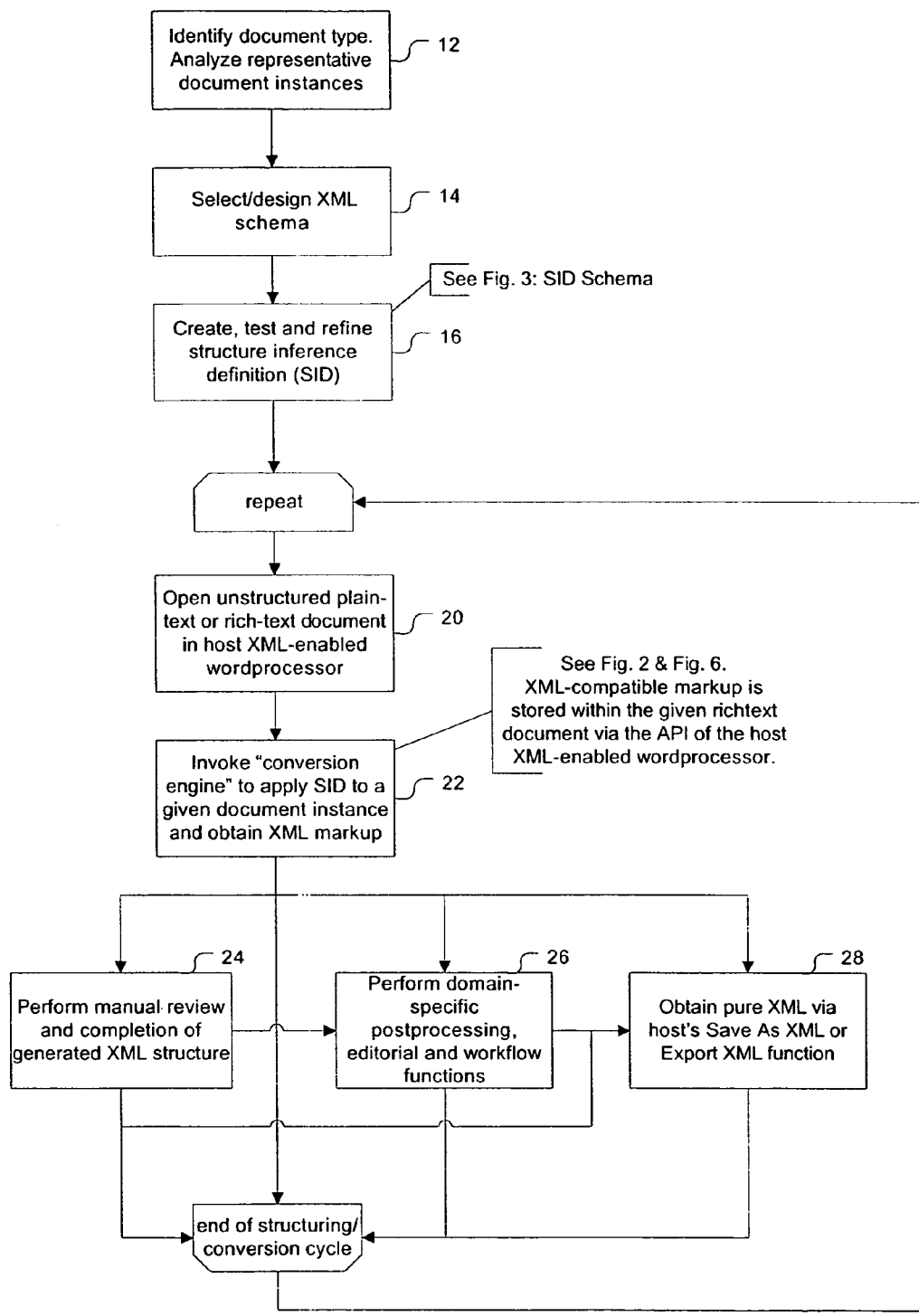
FIG. 1 is a diagram that encompasses the complete workflow from user's perspective: document analysis, creation of a structure inference definition, invoking the conversion/structuring engine to apply markup to a target document, and performing any post-processing editorial and domain-specific functions.
Figure 2:
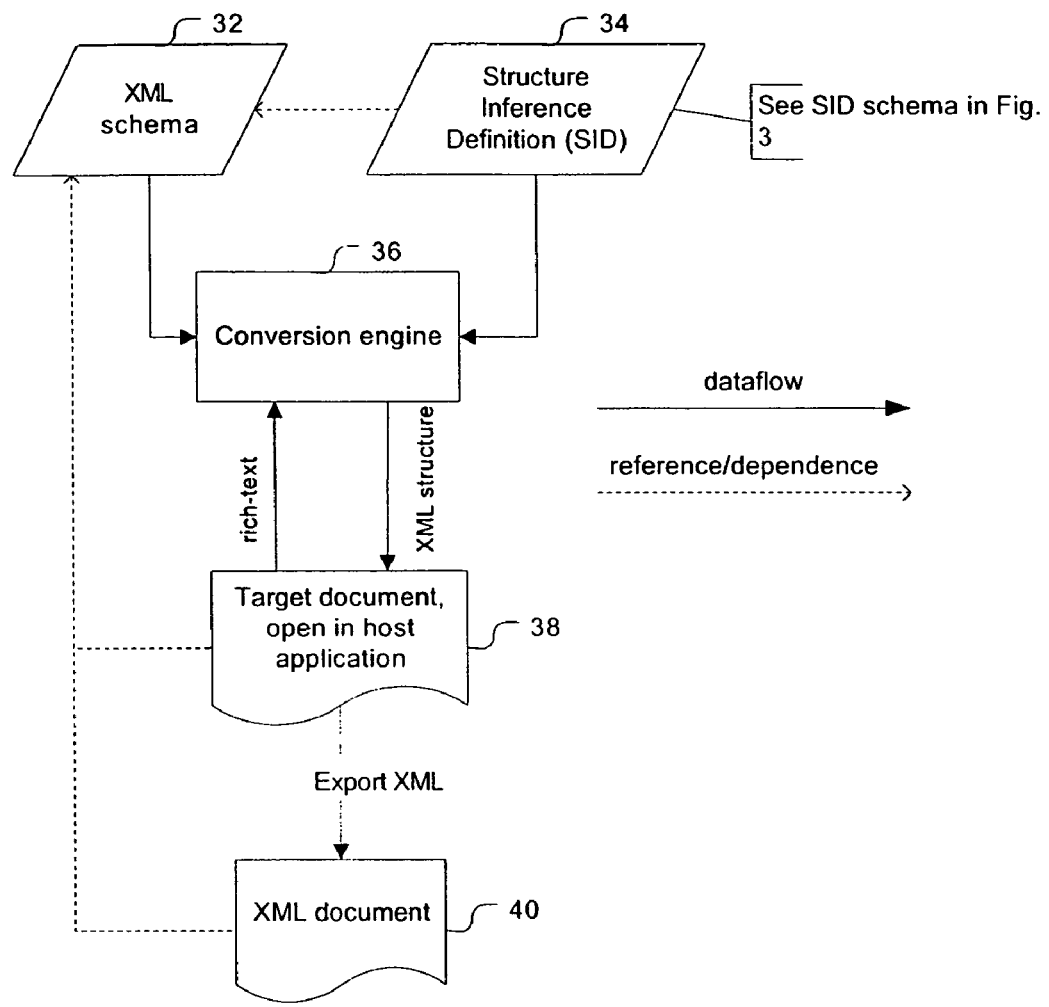
FIG. 2 is a block diagram of the essential dataflow in relation to the conversion/structuring engine based on the assumption that the structure inference and creation process will take place within a qualified XML-enabled wordprocessor.
Figure 9:
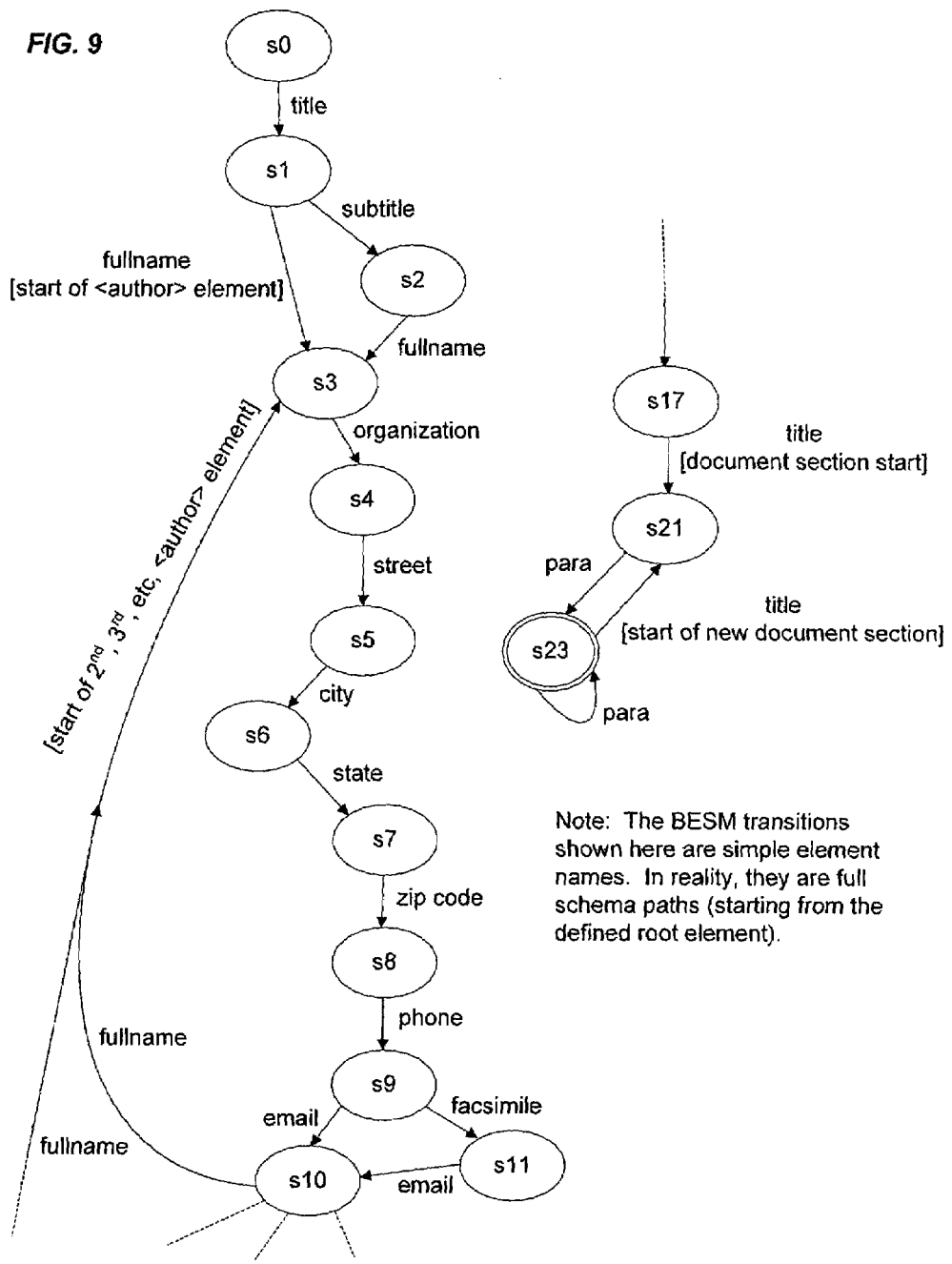
FIG. 9 shows two sample fragments of constructed baseline element state machines. Incorporating the identities of XML elements from different levels of the schema tree into a single state machine can be seen.

FIG. 1 depicts the general workflow in which the current embodiment is typically engaged. Document analysis, XML schema design or adaptation, and creation of a structure inference definition (SID) logically precede the use of the conversion engine (as well as of any higher-level domain-specific integrated applications consuming the produced XML markup), but in practice all these activities may and often need to be performed in parallel, at least until a point when the schema design is settled and the SID is completed and fully "debugged" and fine-tuned to adequately handle the predominant number of documents belonging to the target document type. FIG. 2 depicts the operation of the conversion engine when viewed from an outside, as a black box. It should be completely self-explanatory given the preceding background information.

Document analysis is performed at the beginning of each conversion project. The goal is to identify a relatively uniform subset of documents, in terms of formatting used and inherent logical structure. Each such subset constitutes what is called here a document type and is the basis for creating or choosing an XML schema and creating a corresponding SID. Given the schema-guided nature of the present structure inference method, it is crucial that the inherent logical structure of the documents to be converted to XML be adequately captured in the schema/DTD, including variability such as optional and multi-repetition elements and element groups of undefined order. But just as creating element content models that are too tight is undesirable, so is allowing for too much variability and indefiniteness. The conversion engine makes progress through the document by trying to follow element transitions in the BESM, which reflect what is considered expected/valid element structure according to the schema. The closer the guidance, the better the XML conversion results are likely to be.

When the originally-unstructured document instances are too inconsistent in structure or formatting, preprocessing may become necessary (before the SID-driven automatic structuring). Manual preprocessing may include making any changes to the documents to bring them into conformance with the established document type. The SID schema (FIG. 3) has provisions (in the global settings 44) for specifying certain types of automatic preprocessing. These can include whitespace normalization (including of paragraph/line breaks), converting floating text boxes to inlined text, or running a custom macro to do some cleanup or normalization.

The most extensive part of SID creation is defining (and testing and refining) recognition patterns for paragraph-extent document elements (48) and for fractional-paragraph elements (52), which are the main types of baseline elements in the present design. The third type is multi-paragraph elements (50), which is somewhat like a composite type and is discussed later on. The present conversion model chooses the paragraph level as the basic level of granularity for document parsing, as most elements in a typical textual document type tend to be of paragraph extent, and paragraphs are a distinct unit of content in any wordprocessor. Restricting text and formatting pattern searches to the range of a paragraph is also a good performance optimization. For creating markup below the paragraph level in the context of a paragraph-extent baseline element, additional text, keyword and formatting patterns may be defined (54) so that child elements can be identified and properly delimited.

Fractional-paragraph element definitions are most suitable for capturing elements that occur at generally expected locations in the document with respect to other elements, singly or in sequence within a paragraph. For example:

Publication date: Aug. 7, 2002

Authors: Harold, J.; Ming, K.

Reviewer: Statty, J.

Here, suppose the date itself is to be enclosed in a <date> element, while the label "Publication date" remains unmarked. The following paragraph may need to be marked up as <authors>, but then each author name needs to be enclosed in its own element, so <author> is going to be the target of a fractional-paragraph baseline element definition.

Fractional paragraph elements can be matched by defining three different patterns for them: an optional or required leading pattern 64 (typically a text "label"); a pattern 66 for the element's content itself (this may be a text pattern, a wildcard or regular expression pattern or a predefined pattern for recognizing common content types such as dates and addresses, and the pattern may include formatting features); and an optional or required trailing pattern or delimiter 68. When a fractional-paragraph element is matched, matching of the next expected baseline element(s) is normally attempted just past the match within the same paragraph. Options can be specified (for example, in 52) that require or prohibit a baseline element to start within a paragraph, versus at the beginning, or an exception to allow a paragraph-element match to start right after a fractional-paragraph element within a paragraph.

If any of the above three components of a fractional-paragraph baseline element definition is missing, appropriate pattern matching semantics can be defined. For example, if there is no content pattern defined, the range between the matches for the trailing and leading patterns implicitly becomes the element's range. If there is only a leading pattern, the content range can include the remainder of the paragraph.

Multi-paragraph element definitions (50) include multiple paragraph patterns, in Contained Paragraph definitions 62, and are most suitable for XML elements spanning multiple paragraphs of text, not each of which needs to be enclosed in its own element. The Contained Paragraph definition 62 allows optionally specifying a paragraph element name to be used for marking-up an individual matched paragraph. A match for a multi-paragraph baseline element starting from a given document position is declared if each of the contained paragraph definitions yields a match, in sequence, with the specified minimum number of paragraphs and up to the maximum specified number. A possible extension to the Multi-Paragraph Element definition 50 shown is to allow including fractional-paragraph element definitions among the contained paragraph definitions. As a simple example, a US address block could easily be parsed using such a definition: The street address is on a line (paragraph) by itself, but the state, city and ZIP code form a sequence on a single line. We expect the four element to always appear together, in this order, hence using a multi-paragraph baseline element (vs. a separate baseline element definition for each element). Given successful match of all baseline elements defined in the schema against the document's contents, the conversion engine will be able to create all higher-level markup automatically, up to the root element. This is possible because in most cases an exactly matching sequence of baseline elements unambiguously determines the schema tree context, from which the names of all enclosing elements can be inferred. The crucial requirement is that appropriate recognition patterns are defined for all occurring baseline elements and that these patterns are matched against the actual document content. Certain types of exceptions and discrepancies can be handled by the conversion engine (discussed later), but for the most part the structure of the documents to be converted should be predictable and must therefore be modeled closely by the schema.

At conversion time (FIG. 6), the engine loads the document's target schema/DTD and the associated SID file. BESM construction (106, detailed in FIG. 7) entails performing a transformation of the schema tree that yields a single (validation type of) finite state machine, which represents a flattened view of the document structure wherein all baseline elements for which recognition patterns have been defined are viewed as immediate children of the root element, and all intermediate element levels as well as any sub-baseline-level elements are removed. (The full schema paths of all baseline elements are remembered, however, to enable constructing all higher-level markup.) BESM construction is done based on recursion on the content models of all schema elements, starting from the designated root element. In a given context (content model group), a state machine fragment is obtained for each child content particle (CP=child element or group), and the fragments are combined according to the context group's order (choice, sequence, all) and repetition (*, +, ?) specifiers. For an element CP, if the element's path (as determined by the current chain of recursive calls) can be mapped to the schema path of a baseline element definition, a state machine fragment with two new states is created, the transition label being the element's full path and including a reference to the baseline element definition in memory (as shown in FIG. 8). Then the element's repetition specifier is applied to the state machine fragment. If there is no corresponding baseline element, either an error can be returned and the process terminated or the element can be automatically omitted, as if it were not declared in the schema. For a group CP, a state machine fragment is obtained recursively and then the child group's repetition specifier is applied.

Note: Instead of working with state machine fragments, equivalent regular expressions can be used for the intermediate results, and the final single regular expression can be converted to an equivalent state machine, preferably a deterministic one. The Grail Library, created in the University of Western Ontario, can be used [after some debugging and optional optimization] for construction and interrogation of finite state machines and regular expressions (among other related constructs).

Baseline elements are designated as such by means of schema paths in the SID (that's the 'target' attribute in 46, FIG. 3). A schema path is a simple XPath-like expression and consists of one or more steps. The first step must reference a global schema element or type. Each subsequent step specifies a child element of its respective parent. A simple example is 'address/postal/zip'. Sibling indexing, like in XPath, can be allowed to distinguish children with the same name. The schema paths used in baseline element definitions (BEDs) are defined in terms of the logical structure of the schema. An XML schema models the structure of all possible (valid) document instances. The BESM, however, makes references to specific element instances, with respect to the designated root element, of the schema elements and types that are explicitly targeted by BEDs. For example, if a BED has a schema path of 'section/title', there may be multiple element instances (in a document instance associated with the given schema) to which this BED is applicable: 'book/chapter/section/title', 'book/appendix/section/title', etc. Hence, a BESM transition corresponds to an element instance in a specific context, as determined during the recursion (vs. the more generic schema paths used in BEDs). One way to do the mapping is to compare the current element path during recursion against the schema paths of all BEDs, step by step, in reverse order, and choose the longest matching schema path (if any). As a special case, when the first step of a schema path designates a schema type, any element of that type can be considered to match. Using the longest match allows to have one BED for a baseline element in some general context, for example 'section/title', and another for the same element but in a more specific context, for example 'appendix/section/title'.

The BESM along with the matching of baseline element patterns guides the conversion engine during the main structure inference loop (152-178, FIG. 10). The document content is parsed sequentially, in a single pass, while a current state (node) in the BESM is maintained. A <document position, BESM state> pair is called conversion state. Conceptually, it denotes a reachable point in the complete conversion space, which encompasses all possible conversions (ways of applying XML markup) of a given document instance. At each step the conversion engine attempts to make an allowed ("XML-valid") transition to a different BESM state by trying to match the pattern defined for the XML element corresponding to a particular transition against the text content and formatting properties of the current document paragraph, sequence of contiguous paragraphs, or remaining paragraph fraction (166). Each such successful pattern match (BESM transition) implies a plausible selection of an XML element for markup of the matched document range or appropriate sub-range thereof (depending on the text layout definition of the baseline element). A new conversion state is obtained as shown in step 168.

Because multiple elements can be matched at a given document position, a tree structure, called tentative conversion tree (TCT, FIGS. 11, 12), is built and maintained, which serves to keep track of all competing element matches, to prioritize them based on the defined priorities ('priority' attribute in 46, FIG. 3), and to ultimately settle on one single conversion path. Each TCT node corresponds to a reachable conversion state and has a plausibility rating computed for it (180), which determines tree pruning decisions. References to the current TCT leaf nodes can be maintained in a heap (priority list) to efficiently determine the leading step (TCT node) of the tentative conversion path that should be furthered in the next iteration of the structure inference algorithm (154). The TCT needs to be pruned continuously to limit the number of competing conversion paths. The condition that triggers pruning (156) can be based on the length of the current conversion path (which is the distance between the current leading step node and the TCT root), some moving average (EWMA—exponential weighted moving average) of recent transition gains (transition gains being the CPR deltas as shown in the annotations to steps 168, 174 and 176), and possibly other internal state information.

When no transition is possible from the current conversion state or the best transition gain is unsatisfactory according to some predefined measure, and the document end is not reached yet (172), two main synchronization heuristics are attempted: skipping one possible BESM transition (174) or skipping to the next document paragraph (176). Each such skip results in a different conversion state, with a new leaf TCT node appended, whose plausibility rating (CPR) will reflect an appropriate skip penalty. Implicitly, branching of the TCT results, off the current leading step (node).

When a single conversion path is settled as a result of repeatedly committing the current TCT root (step 158), the XML-compatible structure or actual XML markup implied by it can be constructed. (In general, this can be done either during or after the core structure inference loop. If after, the committed TCT root nodes would have to be collected in a linked list.) Each BESM transition readily provides a baseline element name. The document range for that element is obtained from the pattern match information, remembered in the corresponding TCT node (of type 182). All higher-level structure is inferred based on the baseline element context information, nesting, and the full information about the content models of higher-level elements. One conceptually straightforward implementation is detailed in FIG. 13. It employs several simple heuristics to resolve ambiguity and always aims to produce XML-valid structure. The baseline element's path will show what all ancestors are supposed to be. The element paths of the last committed baseline element and of the new element can be compared (at 312) step by step starting from the root. If there is a match, the two elements could have the same ancestor, and if decided so, the range of that ancestor will be extended to span the new element as well (at 316). But if the element names differ or if analysis of the content models of all children shows that invalid structure would result, a new branch is started with the element name of the current step of the new baseline element's path (at 320). To illustrate with an example:

Element path of last baseline element committed: article/header/pubdate

Element path of new baseline element being committed: article/section/title

<article> is the only common ancestor, and its end needs to be extended to cover the new element's range. Then, new <section> and <title> elements will be created to enclose that range. Continuing the example, if the element path of the next committed baseline element is 'article/section/para', the existing <section> will be extended, and a <para> sibling will be created next to the <title>.

A subsequent case wherein analysis of child content model mandates starting a new element branch:

Last element path: article/section/para

New element path: article/section/title

Here, according to condition 312 alone, the new <title> should be enclosed in the existing <section>, but because in the content model of <section> a <title> can occur only as a first child, we start a new branch (at 320), that is, start a new <section> and then create the new <title> baseline element in it. To handle the general case, the content models of all descendents may need to be considered in order to make such a branching determination. An alternative, more robust but also more computation-heavy implementation can do partial validation at each level of the last committed baseline element's path and determine whether the element at the same corresponding level from the new path can be part of a valid instance of the respective parent element. This would work just like normal XML validation, but several validation state machines would need to be maintained simultaneously, one for each level of "open" element structure.

After a matched baseline element is committed and marked up in the document, any additional sub-baseline markup can be created (at step 326). In the case of a paragraph-extent baseline element, the sub-paragraph markup definition 54 can include patterns for any inline child elements within the paragraph element. The patterns can be defined similarly to the patterns for fractional-paragraph baseline elements, but the conversion engine will try to find a match throughout the range of the paragraph, not starting from a single specified position. In the case of multi-paragraph baseline elements, the match range for each contained paragraph is already known. If a paragraph element name is specified in the associated Contained Paragraph definition 62, such an element can be created. (Match information for contained paragraphs can be stored in an extension to the Markup Conversion Step structure 182 or in a supporting structure, which is attached to the instance of 182 corresponding to the multi-paragraph baseline element match.) Further, each Contained Paragraph definition 62 can include definitions for creating sub-paragraph markup, just like in the case of paragraph baseline elements.

The actual formatting patterns used in an embodiment can vary somewhat depending on particular features supported by the chosen host wordprocessor, but most types are quite generic. Text patterns can include literals, wildcards (for example, as supported by Microsoft Word), and regular expressions. A preferred choice of regular expression syntax is that of the W3C XML Schema language, as this would allow xs:pattern values from the target schema to be automatically extracted and used as content patterns for paragraph and fractional-paragraph elements. Another practically useful type of text pattern is keyword lists. Such keyword lists can be specified either in the SID or derived from enumeration constraints in the XML schema. Following is a summary of the types of atomic patterns, higher-order pattern constructs, and pattern matching rules pertinent to the present embodiment.

General

Whitespace after a previously matched element pattern is automatically skipped (ignored), including blank paragraphs and whitespace between the component patterns of a fractional-paragraph element definition;

Paragraph patterns (58) and formatting patterns (74) can be combined with Boolean grouping operators: AND, OR, NOT, XOR; multiple levels of logical compositions can thus be formed;

Numeric properties can be matched with different relational operators: ==, >, <=, etc; for example, font_size>=14;

Multiple/alternate pattern sets can be specified for fractional-paragraph elements; for example, one set may consist of a leading pattern and a trailing pattern, while another may specify only a content pattern.

Paragraph Patterns and Properties

Indentation: Microsoft Word paragraph property or based on leading whitespace

Alignment

List format: Word style or based on text patterns

Outline level

Has borders?

Formatting (see below)

Text pattern to be matched at the beginning, within, or against the entire paragraph VBA macro-based recognition, possibly in addition to other, supported patterns Formatting Specified paragraph or character style (by name);

Font name, font size, font style (bold, italics, underlined, superscript, etc.);

All capital letters? ASCII caps or all-caps font;

Using detailed performance information collected during the structure inference phase, a GUI framework can be provided to a user to facilitate him/her in any necessary manual review, completion, and domain-specific post-processing of the generated XML markup. Useful functions provided can be: easy review and navigation of the generated markup (or some alternate GUI representation thereof); display of validity information about the markup (with the help of the host application); display of document ranges where no structure could be inferred as well as any other potential "trouble spots" identified according to the operation and heuristics employed by the structure inference method; and additional, domain-specific review and editorial functions. For example, the conversion/structuring report illustrated in FIG. 14 is a rendering of the final, actual conversion path determined during structure inference. The underlined elements can be active (for example, mouse-clickable) links to other GUI objects that visualize the corresponding schema element, baseline element definition, created baseline element, or to position the insertion point at a particular position in the document where pattern match was attempted.

Pure XML data, conformant to the target schema, can be obtained via the host application's native Export/Save XML function. The structure inference and creation process can be limited to and applied only to a select document range or number of ranges. This may be desired in the context of domain-specific XML-aware applications built on top of the host and utilizing automated XML structuring capabilities like described here, for example to automatically mark-up in XML data imported into the document from an external, non-structured source or text entered by the user.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. Further modifications in applications of the principles of the invention as illustrated therein may be contemplated as would normally occur to one skilled in the art to which the invention relates.

What is claimed is:

1. A computer-implemented method for applying XML-compatible markup to unstructured textual documents, the method comprising:

defining an XML schema in accordance with which documents are to be marked up;

opening a target document in a host Application Programming Interface (API) enabled wordprocessor application configured to store XML-compatible non-native markup in documents;

using an API of the wordprocessor application to parse content included in the target document and to perform element pattern matching to yield inferred XML structure in accordance with the defined XML schema by recognizing instances of designated baseline elements via pattern search and matching and by inferring and constructing higher-level element structure based on the defined XML schema; and storing the inferred XML structure within the target document as XML-compatible markup via the API of the wordprocessor application.

2. A method as recited in claim 1 wherein original visual formatting and textual content of the target document remain intact after storing the inferred XML structure within the target document as XML-compatible markup.

3. A method as recited in claim 1 further comprising limiting XML structure inference and markup creation to a select range or number of select ranges of the target document.

4. A method as recited in claim 1 further comprising creating a structure inference definition for the defined XML schema using a dedicated Graphical User Interface (GUI) integrated in a GUI workspace of the wordprocessor application.

5. A method as recited in claim 1 further comprising presenting a user with a GUI to review trouble spots in the target document and to manually correct and complete the automatically generated XML-compatible markup, the trouble spots comprising unmarked ranges, missing required elements from the defined XML schema, and inferred XML structure being invalid according to the defined XML schema.

6. A method as recited in claim 1 wherein opening a target document in a host Application Programming Interface (API) enabled wordprocessor application configured to store XML-compatible non-native markup in documents includes opening the target document in a host API enabled wordprocessor application that includes a plug-in configured to store XML-compatible markup.

7. A method as recited in claim 1 further comprising:

identifying a target document type from a set of textual documents with generally consistent inherent logical structure and formatting;

creating a structure inference definition for the target document type comprising a multiplicity of definitions of baseline elements, the baseline elements being select leaf-level or near-leaf-level elements from the target document type and having a schema context; and defining recognition patterns for the baseline elements.

8. A method as recited in claim 7 further comprising invoking a computer-executable engine to apply the structure inference definition to one or more instances of the target document type to produce XML structure relating to the defined schema, the operation of said engine comprising: parsing the one or more instances of the target document type.

9. A method as recited in claim 8 further comprising defining patterns and structure inference and construction rules for one or more levels of nested elements in a designated baseline element, and configuring the computer-executable engine to use said patterns and rules to produce nested element structure within a text range and the schema context of a baseline element.

10. A method as recited in claim 8 further comprising:
deriving a state machine having transition labels by recursive aggregation of schema element content models, starting from a designated root element and moving to the level of designated baseline elements;
incorporating identities and specific instances of baseline elements in the transition labels of the state machine; and
configuring the computer-executable engine to compile and use the state machine to consider a relatively small number of expected baseline elements at a given document position.

11. A method as recited in claim 7 wherein creating a structure inference definition for the target document type comprising a multiplicity of definitions of baseline elements, the baseline elements being select leaf-level or near-leaf-level elements from the target document type and having a schema context includes identifying a baseline element by a schema path comprising a sequence of one or more XML element or element type steps, a first one of the one or more XML element or element type steps designating a global schema element or type and each subsequent step designating a child element or element group of its predecessor.

12. A method as recited in claim 7 further comprising defining the recognition patterns for the baseline elements to comprise: text patterns selected from the group of literals, wildcards, and regular expressions; formatting patterns selected from the group of font style, font name, font size, composite style name, paragraph indentation, and outline level; and logical compositions of atomic text and formatting patterns and pattern groups.

13. A method as recited in claim 7 further comprising defining the recognition patterns for the baseline elements to comprise:
an optional leading pattern, intended to match a document range immediately preceding a content range of the baseline element, allowing intervening whitespace;
an optional content pattern, intended to match the content range of the baseline element; and
an optional trailing pattern, intended to match a document range immediately following the content range for the baseline element, allowing intervening whitespace, an end document position of the trailing pattern element serving as a starting position for matching recognition patterns of following baseline elements.

14. A method as recited in claim 7 wherein the defining of recognition patterns for the baseline elements comprises assigning a priority value or pattern weight value which influences a selection of one baseline element when the recognition patterns for more than one baseline element yield competing/ambiguous matches at a particular document position.

15. A method as recited in claim 1 wherein opening a target document in a host Application Programming Interface (API) enabled wordprocessor application configured to store XML-compatible non-native markup in documents includes detecting the target document in a predefined incoming document folder or receiving the target document via the API from an external client component.

16. A method as recited in claim 15 wherein using an API of the wordprocessor application to parse content included in the target document and to perform element pattern matching to yield inferred XML structure in accordance with the defined XML schema includes using the API of the wordprocessor application to automatically parse the content included in the target document and to perform element pattern matching to yield inferred XML structure in accordance with the defined XML schema after detecting the target document in a predefined incoming document folder or after receiving the target document via the API from the external client computer.

17. A method as recited in claim 15 further comprising creating a structure inference definition for the target document comprising a multiplicity of definitions of baseline elements, the baseline elements being select leaf-level or near-leaf-level elements from the second target document and having a schema context and defining recognition patterns for the baseline elements.

18. A method as recited in claim 1 wherein opening a target document in a host Application Programming Interface (API) enabled wordprocessor application configured to store XML-compatible non-native markup in each document includes opening multiple target documents.

19. A method as recited in claim 18 wherein using an API of the wordprocessor application to parse content included in the target document and to perform element pattern matching to yield inferred XML structure in accordance with the defined XML schema includes using the API of the wordprocessor application to parse content included in the multiple target documents sequentially or in parallel in an unattended batch mode.

20. A method as recited in claim 18 further comprising creating a structure inference definition for the multiple target documents comprising a multiplicity of definitions of baseline elements, the baseline elements being select leaf-level or near-leaf-level elements from the multiple documents and having a schema context and defining recognition patterns for the baseline elements.

* * * * *